No. 633,564. Patented Sept. 26, 1899.
H. J. BRANTLEY.
LIQUID MEASURE.
(Application filed Oct. 3, 1898.)
(No Model.) 2 Sheets—Sheet 1.
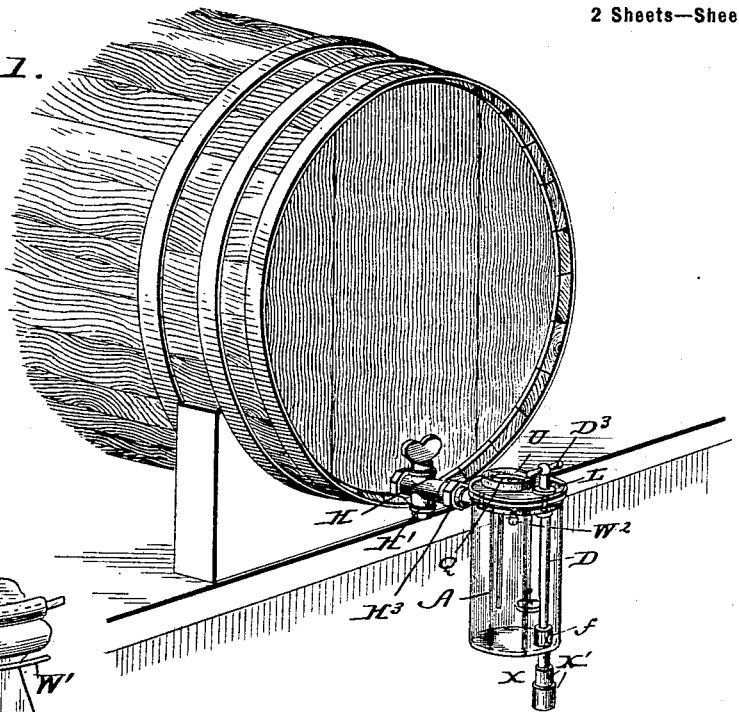
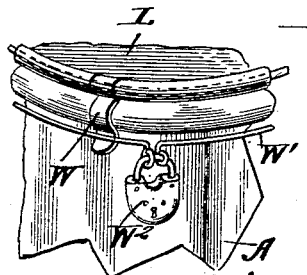
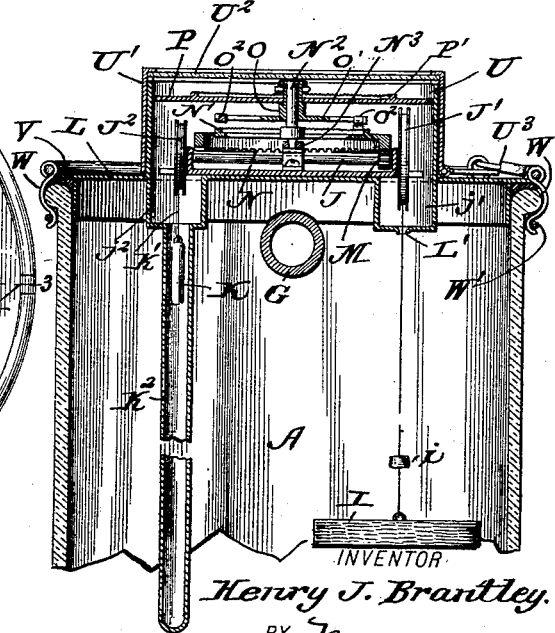
WITNESSES:
M. D. Bloudel
P. B. Turpin
INVENTOR
Henry J. Brantley.
BY Munn & Co.
ATTORNEYS.
THE NORRIS PETERS CO., PHOTO-LITHO., WASHINGTON, D. C.

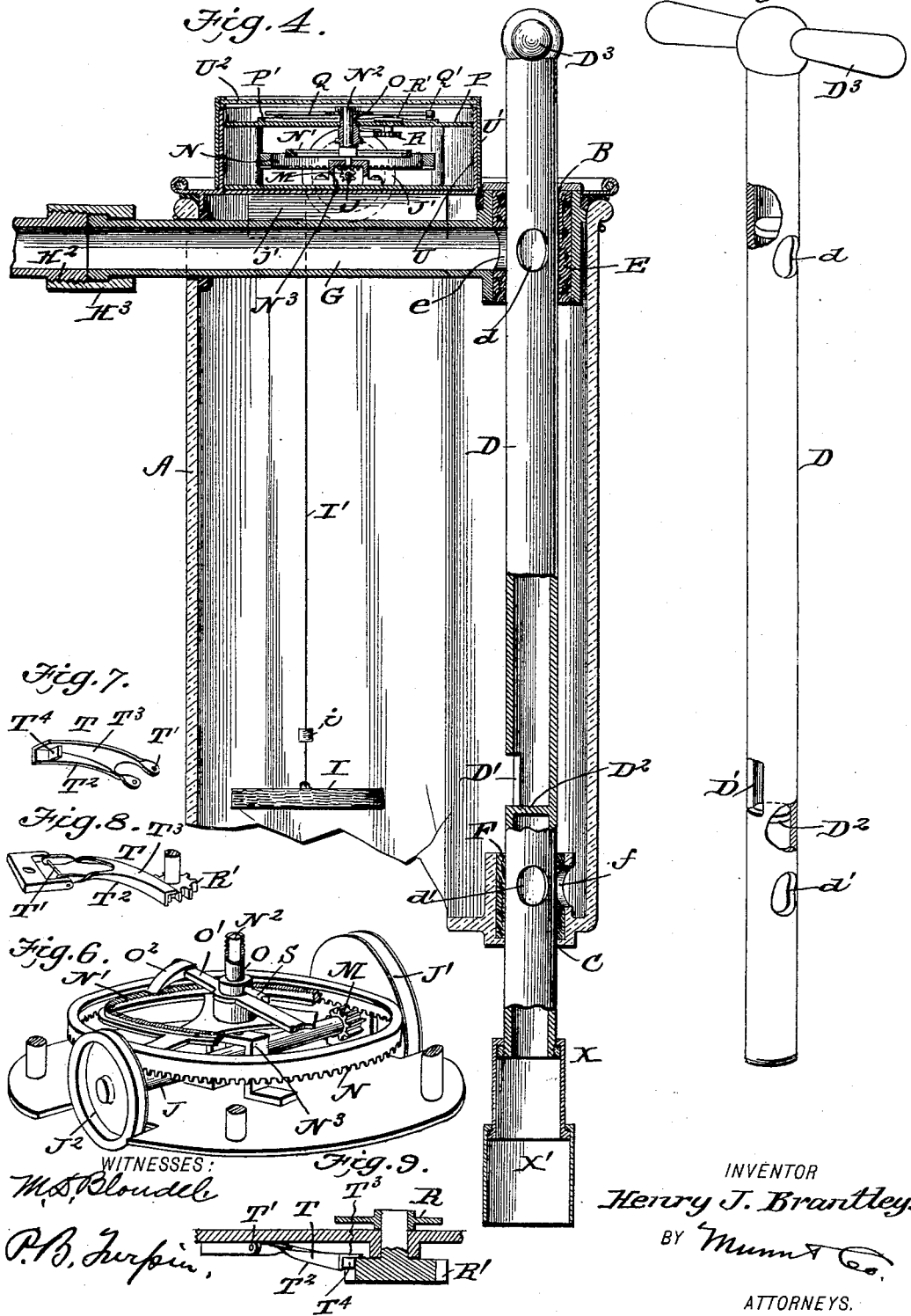

UNITED STATES PATENT OFFICE.

HENRY JONATHAN BRANTLEY, OF TAMPA, FLORIDA.

LIQUID-MEASURE.

SPECIFICATION forming part of Letters Patent No. 633,564, dated September 26, 1899.

Application filed October 3, 1898. Serial No. 692,494. (No model.)

*To all whom it may concern:*

Be it known that I, HENRY JONATHAN BRANTLEY, a citizen of the United States, residing at Tampa, in the county of Hillsborough and State of Florida, have invented a new and useful Improvement in Liquid-Measures, of which the following is a specification.

My invention is an improved apparatus for use in dispensing liquids, and has for an object to provide a simple accurately-working construction which will indicate and register the amount of liquid drawn through the apparatus; and the invention consists in certain novel constructions and combinations of parts, as will be hereinafter described, and pointed out in the claims.

In the drawings, Figure 1 is a perspective view of the invention as in use. Fig. 2 is a top plan view of the improved apparatus. Fig. 3 is a vertical longitudinal section on about line 3 3 of Fig. 2. Fig. 4 is a vertical longitudinal section on about line 4 4 of Fig. 2. Fig. 5 is a detail view of the valve-pipe. Fig. 6 is a detail perspective view of a portion of the registering mechanism, showing the counterbalanced shaft, with its pinion, the main gear, and the arm provided with a detent engaging the rack of the main gear. Fig. 7 is an inverted detail perspective view of the detent for the pinion of the multiplying-register. Fig. 8 is a detail perspective view of such detent and its pinion. Fig. 9 is a cross-sectional view illustrating the detent for the tens-dial, and Fig. 10 is a detail view illustrating the means for locking the top on the body of the vessel.

By my invention I provide for use with a barrel, tank, or other reservoir a dispensing vessel A, through which the liquid from the reservoir is discharged, such vessel A being provided with means whereby the discharge of liquid from the vessel is closed when the liquid is entering the vessel from the reservoir and the supply of liquid from the reservoir is shut off when the outlet-port of the vessel is opened, together with registering means for indicating automatically and accurately the precise quantity of liquid drawn into the vessel. By this means the purchaser of a barrel of liquid which is dispensed from time to time is able when the barrel is empty to determine exactly how much liquid was in the barrel and can so insure full measure to himself or have proper basis for claiming a rebate. The invention will thus operate to secure full measure to the retailer. When this result is accomplished, the improved apparatus will enable the user to quickly take stock of his barreled liquid, as by subtracting the amount indicated by the register from the original contents of the barrel or cask the amount on hand is determined.

Another advantage which will be apparent when the invention is fully understood is that when a quart, gallon, or other desired quantity is drawn from the cask into the vessel the jug or bottle may be connected with the discharge from the vessel and such discharge opened, thus cutting off the connection with the barrel, and the measured quantity can be permitted to pass into the jug while the attendant can give his attention to other business, thus saving time in the case of a thick heavy material, such as molasses.

A further advantage is that the device dispenses with the necessity of funnels, and so avoids the time necessary to find the funnel when misplaced and to keep the same clean, as is now required.

The vessel A may be of glass or other suitable material in any desired shape and size and is provided at its upper end with an opening B and at its lower end with an opening C for the valve-pipe D, such openings being suitably packed.

The valve-pipe D fits in valve-seats E and F, the former having a port $e$, which registers with the feed-pipe G, and the latter having a port $f$, which registers with a port $d'$ in the valve-pipe, such valve-pipe being also supplied with a port $d$, which may be turned into and out of register with the port $e$. The pipe D also has a port D', which opens into the vessel, and such pipe between the port D' and the port $d'$ is suitably closed, it may be, by means of a plug $D^2$, as shown in Fig. 5. The pipe D has a suitable handle $D^3$, so it can be turned. When in the position shown in Fig. 4, the pipe D is shut off from receiving liquid from the feed-pipe G, and the outlet or discharge from the vessel is also closed. If, now, the pipe D be turned to cause its port $d$ to register with the port $e$, the liquid will flow through the feed-pipe into the pipe D and thence through the port D' into the vessel A until the desired quantity is supplied in such vessel, when the pipe D can be again adjusted to close the port e, thus shutting off the supply of liquid. If desired, the pipe D can now be adjusted to bring its port d' into register with the port f, and the liquid will be discharged from the vessel A. The feed-pipe G is suitably connected with the barrel or cask. In practice I find this may be conveniently accomplished by providing a faucet H, having a valve H' and a threaded end H², which is engaged by a threaded connection H³, swiveled on the end of the feed-pipe G, as will be understood from Figs. 1 and 4. By the described construction it will be seen that I furnish three valves between the cask and the discharge from the vessel A, one being the valve H' of faucet H and the other two being supplied adjacent to ports d and d' when the pipe D is in the position shown in Fig. 4, thus avoiding any leakage.

In registering the liquid supplied to the vessel A, I employ a float I, which rises and falls with the rise and fall of the liquid and is connected by a cord I' with a shaft J by securing such cord I' to a pulley J' on the shaft J, such shaft being counterbalanced, preferably, by the weight K, connected by a cord K' with a pulley J² on the shaft J. This shaft J is journaled in suitable bearings above the top L for the vessel A, the cord I' depending through a suitable opening L' in the top L and having a short distance above its float I a valve $i$, which closes the opening L' when the float I reaches its highest point. The weight K operates in a tube K², fitted in an opening in the top L, depending in operation within the vessel A and closed at its lower end. In operation as the float I' rises the weight K descends and winds the cord I' on the pulley J', the reverse being the operation when the float falls, such float being heavier than the weight K or the pulleys K' and K² being so related that the weight of the float will overbalance that of the weight K in the operation of the apparatus. On the shaft J is fixed a pinion M, which is meshed with the main gear-wheel N, which latter has a ratchet-ring N'. The main gear N is also provided with a shaft N², which seats at its lower end in a suitable bearing N³ and projects upward a short distance above the main gear and receives the indicator, which has a hollow shaft O, fitted upon the shaft N², as shown in Fig. 4. This hollow shaft O turns in the dial-plate P and has near its lower end an arm O', which is provided with pawls O², engaging the ratchet-ring N', so the movement of the main gear N will operate to turn the arm O' when the main gear is turned in one direction, but will not operate such arm O' when the main gear is moved in the reverse direction. On its upper end the hollow shaft O has the indicator-hand Q, which registers along the graduations of the dial-plate P, and is provided with a pawl Q', which engages a ratchet-ring P' on the dial-plate, and so operates to prevent any accidental return movement of the indicator during the return movement of the main gear. Thus in operation if the main gear be turned in one direction by the descending weight K on the ascent of the float I the movement of such gear N will by the ratchet-ring N' and pawls O² be transmitted by the hollow shaft O to the indicator-hand Q, whose pawl Q' will during such operation ride over the ratchet-ring P'; but as the liquid flows out of the vessel A and the float I descends the pawl Q' will prevent the return movement of the indicator-hand as the main gear rides under the pawls O² of the arm O'.

From the foregoing the operation of registering upon the single dial P will be understood. For registering from the units-dial P to the tens-dial R, I provide on the shaft O a projecting pin or arm S, which at each revolution of the indicator O engages the pinion R' of the tens-dial and moves such pinion one step. To lock the tens-pinion from movement except when desired and to permit resetting the register, I provide the detent T, which is pivoted at T', has an inclined edge T² for engagement by the pin S, a flange T³ to rest upon the pinion R', and a tooth T⁴, which fits between two of the teeth of pinion R' and locks such pinion from movement when the parts are in the normal position shown in Fig. 9. As the pin S sweeps around toward the pinion R' it engages the inclined edge T², gradually lifting the pawl P until just as the pin S operatively engages the pinion R' it moves the detent T to such a height that its tooth T⁴ escapes from engagement with the pinion R', so the latter can be moved by the pin S, and as the pin S moves out of operative engagement with the pinion R' it releases the detent T, and the latter drops again into engagement with the pinion R'. From this it will be seen the detent T locks the pinion R' from movement in either direction except during the short interval of time when such pinion R' is being moved by the pin S, the said pin S being the means for freeing the detent from engagement with the pinion R' at such time. Where desired, this same principle can be carried out in further multiplying the registration, the tens-indicator operating the hundreds, and so on.

In forming the top I prefer to provide it with drop portions $j'$ and $j^2$ to receive the wheels J' and J², as will be understood from Figs. 3 and 4, and the case U, which receives the registering mechanism, is covered by the cup-shaped box U', having the glass pane U², and secured at U³ by a padlock, seal, or other suitable fastening, as may be desired. The top L seats on a gasket V upon the top of the body of the vessel A and is secured by means of the clasps W turning down over and beneath the bead at the top of the vessel-body and held by the wire W', which may be secured at $W^2$ by a padlock, as shown, by a seal, or in other suitable manner.

In the operation of my invention it will be understood from the foregoing that the valve-tube may be adjusted to permit liquid to flow from the cask into the vessel A and at the same time to close the outlet of the vessel A to cause the liquid to rise in such vessel and that the rise of the liquid in such vessel will serve to operate the registering mechanism, thus insuring a proper register of all liquid drawn into the vessel A.

The vessel A has a discharge-tube X, which is made in telescopic sections $X'$, so it can be adjusted to properly fill jugs of different heights. I am thus able to dispense with the use of funnels and the like, as will be readily understood.

While my invention is shown as applied to measuring from a barrel, it is manifest it may be employed for measuring and registering greater quantities—such, for instance, as oils drawn from tanks—or very small quantities—such as medicines, perfumes, and the like—and it is obvious such modifications may be made as prove necessary in adapting the improvement for such uses.

Having thus described my invention, what I claim, and desire to secure by Letters Patent, is—

1. In an apparatus substantially as described, the combination of the vessel, means for controlling the admission of the liquid to and its discharge from the vessel, the counterbalanced shaft having a pinion, the float connected with and operating upon said shaft, a gear-wheel meshing with the pinion of said shaft, the dial, the indicator-shaft having an arm provided with detents engaging said gear-wheel, the dial, and the indicator-hand, and a second detent coöperating with that engaging the main gear, substantially as set forth.

2. In an apparatus substantially as described, the combination of the indicator-shaft, means for operating the same, a succeeding indicator-shaft having a pinion, a projecting arm on the first shaft for engaging and operating said pinion, and a detent for the said pinion, such detent being arranged for engagement by the projecting arm as the latter moves into engagement with the pinion whereby the said pin or arm may release the detent from its pinion and then operate such pinion, substantially as set forth.

3. In an apparatus substantially as described, the combination of the vessel having the inlet and discharge ports, the valve-tube having ports movable into and out of register with the inlet and discharge ports of the vessel and a feed-port discharging into the vessel, the float operating in the vessel, the counterbalanced shaft operated by said float, the gear-wheel meshed with said counterbalanced shaft and having a ratchet-ring, the indicator, the dial having a ratchet-ring, and detents on the indicator for engagement with the rings of the dial and gear-wheel, substantially as set forth.

4. In an apparatus substantially as described, the combination of the main gear having a shaft, means for operating the main gear and the indicator having a hollow shaft fitting on the shaft of the main gear and provided with detents engaging said gear, the dial, and the detent operating in connection therewith, substantially as set forth.

5. In an apparatus substantially as described, the combination of an indicator-shaft having a projecting pin or arm a succeeding indicator having a pinion arranged for operation by said pin or arm, and a detent by which to lock such pinion from movement, said detent having an incline arranged for engagement by the pin or arm whereby the pin or arm may release the detent as it moves into engagement with the pinion, substantially as set forth.

6. In an apparatus substantially as described, the vessel having a body provided with means for permitting the supply and discharge of the liquid, and having the lid provided with the casing for the register and within the same with the dropped portions receiving the wheels for the counterbalancing and float cords, the register having a shaft provided with wheels fitting in said drop portions, a tube for the counterbalancing-cord depending from the lid and the counterbalancing and float cords, substantially as set forth.

HENRY JONATHAN BRANTLEY.

Witnesses:
SOLON C. KEMON,
PERRY B. TURPIN.